US006698382B1

(12) United States Patent
Blaszak et al.

(10) Patent No.: US 6,698,382 B1
(45) Date of Patent: Mar. 2, 2004

(54) COLLAPSIBLE CONTAINER

(76) Inventors: Benjamin D. Blaszak, 761 Ottawa Dr., Troy, MI (US) 48085; Alfia N. Coski, 55 E. Long Lake Rd., #374, Troy, MI (US) 48085; John E. Coski, 55 E. Long Lake Rd., #374, Troy, MI (US) 48085; Cynthia A. Bryla, 761 Ottawa Dr., Troy, MI (US) 48085

( * ) Notice: Subject to any disclaimer, the term of this patent is extended or adjusted under 35 U.S.C. 154(b) by 0 days.

(21) Appl. No.: 10/282,606

(22) Filed: Oct. 29, 2002

(51) Int. Cl.[7] ............................................... A01K 1/035
(52) U.S. Cl. ...................... 119/168; 119/498
(58) Field of Search ................ 119/168, 498, 119/499

(56) References Cited

U.S. PATENT DOCUMENTS

| | | | | |
|---|---|---|---|---|
| 443,397 A | * | 12/1890 | Mack ......................... 229/115 |
| 3,016,042 A | | 1/1962 | Curn, Jr. ...................... 119/19 |
| 3,154,052 A | | 10/1964 | Sweeney ...................... 119/1 |
| 3,185,378 A | * | 5/1965 | Rosenburg, Jr. ............ 229/115 |
| 3,581,977 A | | 6/1971 | Kirsky et al. ................ 229/37 |
| 3,730,418 A | * | 5/1973 | Spencer .................. 229/117.18 |
| D230,285 S | | 2/1974 | Dilley ........................ D30/99 |
| 3,890,930 A | | 6/1975 | Clark ............................ 119/1 |
| 4,269,348 A | * | 5/1981 | Young ........................ 229/115 |
| 4,787,335 A | | 11/1988 | Carlyon ......................... 119/1 |
| 4,792,082 A | | 12/1988 | Williamson .................. 229/103 |
| 4,813,376 A | | 3/1989 | Kaufman et al. ............. 119/1 |
| 4,884,527 A | | 12/1989 | Skirvin ......................... 119/1 |
| 4,940,016 A | | 7/1990 | Heath .......................... 119/1 |
| 4,981,104 A | | 1/1991 | Goodwin .................... 119/168 |
| 5,014,649 A | | 5/1991 | Taft ........................... 119/168 |
| 5,117,781 A | | 6/1992 | Roach ........................ 119/168 |
| 5,129,364 A | | 7/1992 | Pirkle ......................... 119/167 |
| 5,167,205 A | * | 12/1992 | Bell et al. ................... 119/168 |
| 5,203,282 A | | 4/1993 | Hasiuk ....................... 119/168 |
| 5,249,550 A | | 10/1993 | Hines et al. ................ 119/168 |
| 5,337,700 A | | 8/1994 | Toft ........................... 119/168 |
| 5,394,834 A | | 3/1995 | Queen et al. ............... 119/168 |
| 5,396,864 A | | 3/1995 | Mannschreck .............. 119/174 |
| 5,465,686 A | | 11/1995 | Monetti et al. ............. 119/168 |
| 5,572,951 A | | 11/1996 | Evans et al. ................ 119/168 |
| 5,765,504 A | | 6/1998 | Evans et al. ................ 119/168 |
| 5,913,282 A | * | 6/1999 | Indes et al. ................. 119/168 |
| 5,950,568 A | | 9/1999 | Axelrod et al. ............. 119/499 |

FOREIGN PATENT DOCUMENTS

FR      2 618 050      7/1987

* cited by examiner

*Primary Examiner*—Charles T. Jordan
*Assistant Examiner*—Kimberly S. Smith
(74) *Attorney, Agent, or Firm*—Gifford, Krass, Groh, Sprinkle, Anderson & Citkowski, P.C.

(57) ABSTRACT

A collapsible container having three generally rectangular panels each of which has opposed parallel side edges and opposed parallel end edges. The side edges of each panel are hingedly secured to one side edge of each of the other panels. Additionally, one of the panels includes a fold line extending midway between and parallel to the side edges of that panel thus dividing that panel into two subpanels. The panels are movable between an open and a closed position. In their open position, the panels form a triangular shaped structure whereas in their collapsed position, the panels and subpanels lie in closely adjacent and generally parallel planes to each other. Optionally, the triangular structure can contain cat litter on its interior.

9 Claims, 3 Drawing Sheets

COLLAPSIBLE CONTAINER

BACKGROUND OF THE INVENTION

I. Field of the Invention

The present invention relates generally to containers and, more particularly, to a collapsible container.

II. Description of the Prior Art

There are many previously known collapsible containers that are movable between a collapsed and an open position. In their collapsed position, the containers typically minimize the volume for the container thus minimizing transportation costs and storage area requirements. Conversely, in their open position, these previously known containers are ready for use.

Although there have been a number of previously known collapsible containers, these previously known collapsible containers have suffered a number of disadvantages. One disadvantage of these previously known collapsible containers is that, when in their open position, the container lacks sufficient rigidity to be used for a number of different applications. Indeed, some of these previously known collapsible containers are prone to undesirably collapse when in their open position, oftentimes spilling the contents of the container.

A still further disadvantage of many of these previously known collapsible containers is that multiple steps are necessary to move the container from its collapsed position into its open position. Furthermore, unless the proper steps are followed to move the container from its collapsed and to its open position, undesired spillage of the contents of the container can result.

One area for which a collapsible container would be particularly desirable is for use as a cat litter box. Most cat litter boxes typically comprise a tray which is filled with cat litter. After extended use of the cat litter box, the box generates unpleasant odors which require cleaning and replacement with new cat litter.

Previously, it has been necessary to physically handle the cat litter in order to properly clean the cat litter box. This in itself can create health hazards, such as toxoplasmosis risk for women.

Furthermore, since these previously known cat litter boxes must be filled with cat litter, spillage of the cat litter, either when filling the cat litter box or from tears in the cat litter bag, frequently result in cat litter in one's automobile and/or home.

SUMMARY OF THE PRESENT INVENTION

The present invention provides a collapsible container which is particularly suitable for use as a cat litter box.

In brief, the collapsible container of the present invention comprises three generally rectangular panels wherein each panel has opposed parallel side edges and opposed parallel end edges. Each side edge of each panel is hingedly secured to one side edge of each of the other panels. Preferably, the panels are formed from a one-piece blank while a fold line in the one-piece blank forms the hinge attachment between the three panels.

One of the three panels further includes a fold line extending midway between and parallel to the side edges of that one panel. The fold line thus divides that one panel into two subpanels.

The panels and subpanels are movable between an open position and a collapsed position. In their open position, the panels form a generally triangular shaped structure in which the subpanels are generally coplanar and adjacent each other. Conversely, in their collapsed position, the panels and subpanels lie in closely adjacent and generally parallel planes to each other with the panels and subpanels stacked upon each other.

A first flap is hingedly secured to one end edge of each panel so that the first flaps move between an open and a collapsed position as the panels are movable between their open and closed position respectively. When in their open position, the end flaps extend across one end of the triangular structure and substantially close that one end of the triangular structure.

Conversely, a second flap is optionally hingedly secured to the opposite end of each panel and movable between an open and a collapsed position in conjunction with the movement of the panels between their open and their collapsed position. The second flaps, however, are smaller than the first flaps so that, when in their open position, the second flaps form an opening in the second end of the triangular structure. However, since the second flaps, if present, partially close the second end of the triangular shaped structure, the second flaps effectively retain material, such as cat litter, within the interior of the triangular shaped structure when the triangular shaped structure rests upon one of its three panels.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
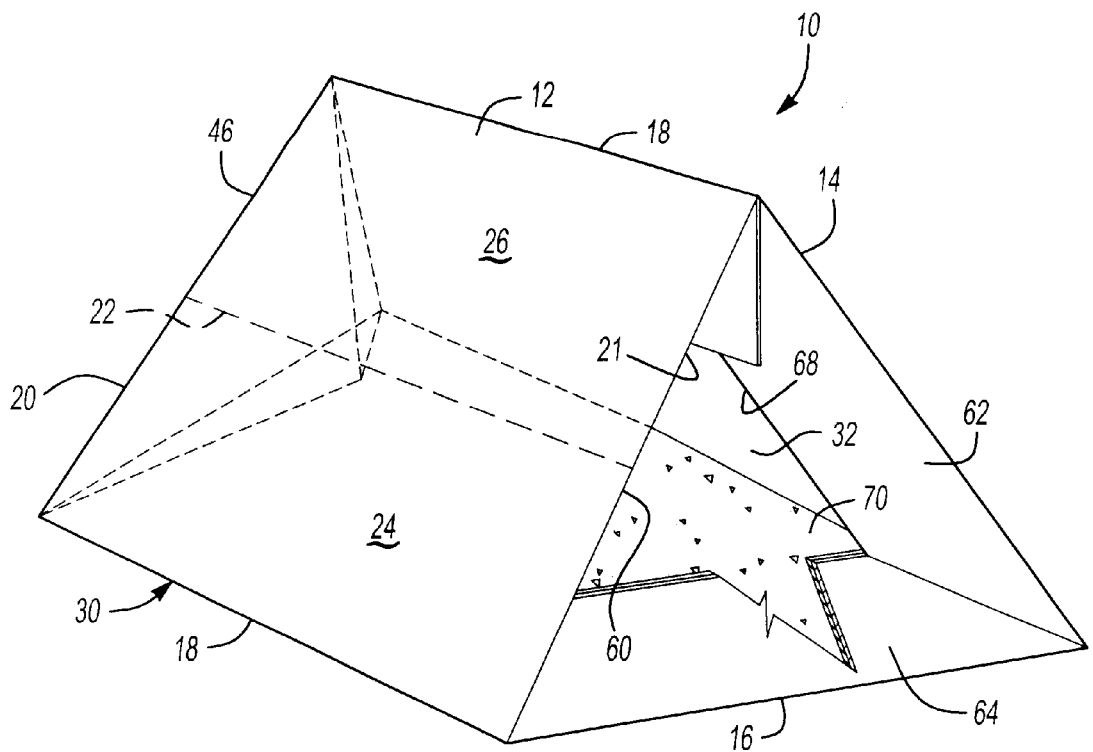
FIG. 1 is a perspective view illustrating a preferred embodiment of the collapsible container in its open position.
Figure 3:
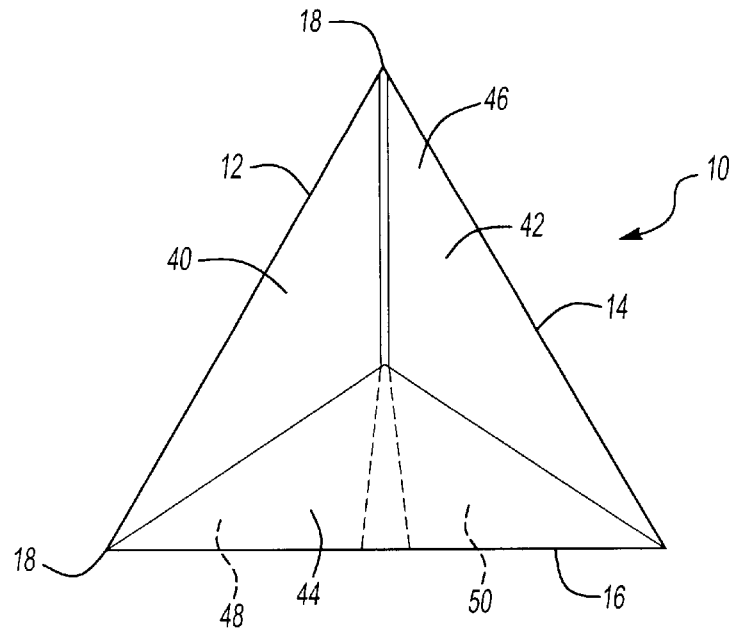
FIG. 3 is an end view of the preferred embodiment of the invention.

With reference first to FIGS. 1 and 3, a preferred embodiment of the collapsible container 10 of the present invention is shown in its open position. The container 10 includes three rectangular side panels 12, 14 and 16 which are preferably of equal size to each other. Furthermore, each panel 12–16 includes a pair of parallel and spaced apart side edges 18 and parallel and spaced apart end edges 20.

Each side edge 18 of each panel 12–16 is hingedly secured to one side edge 18 of the other two of the panels 12–16. Additionally, as best shown in FIG. 1, one side panel 12 includes a fold line 22 extending midway between and parallel to the side edges 18 of the panel 12. As such, the fold line 22 divides the panel 12 into two subpanels 24 and 26. Alternatively, the fold line 22 can be on either of the other two panels 14 or 16.

Figure 2:
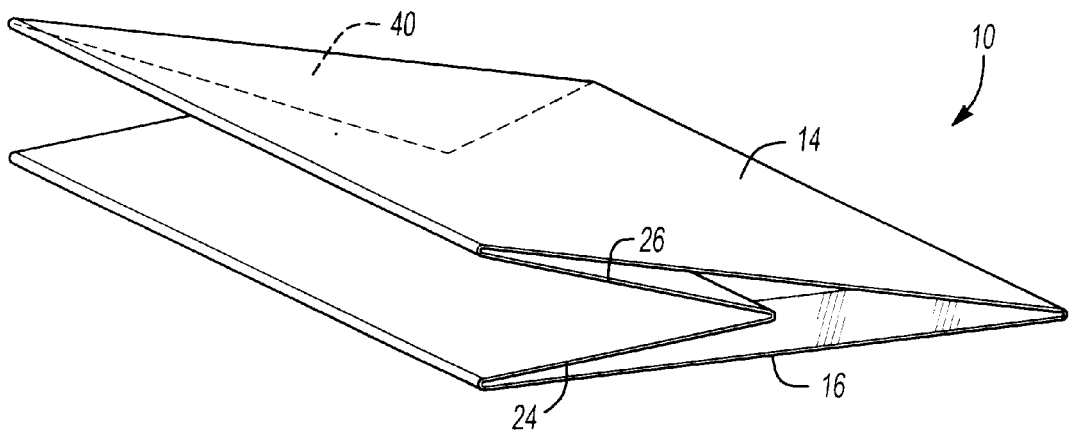
FIG. 2 is a view similar to FIG. 1, but illustrating the preferred embodiment of the collapsible container in its closed position.

The hinged connection between side edges 18 of the panels 12–16 together with the fold line 22 enables the container 10 to move between an open position, illustrated in FIG. 1, and a collapsed position, illustrated in FIG. 2. In its open position, the panels 12–16 form a generally triangular shaped structure 30 having an interior 32. Conversely, in its collapsed position (FIG. 2) the panels 14 and 16, and subpanels 24 and 26 lie in closely adjacent and generally parallel planes to each other thus minimizing or eliminating the interior 32 of the container 10. Since the volume of the container 10 is minimized when in its collapsed position (FIG. 2), the container 10 consumes a minimum of volume to minimize transportation costs and storage area requirements.

With reference now particularly to FIG. 3, first flaps 40, 42 and 44 are hingedly secured to the end edges 20 of the panels 12, 14 and 16, respectively. These first flaps 40, 42 and 44, furthermore, are movable in unison with the panels 12–16 between an open position, illustrated in FIG. 3, and a collapsed position, illustrated in FIG. 2. In their open position (FIG. 3) the flaps 40, 42 and 44 extend across and substantially close a first end 46 of the triangular shaped structure 30. Conversely, in their collapsed position (FIG. 2) the first flaps 40 lie in a plane generally coplanar with the panels 14 and 16.

With reference now particularly to FIG. 3, the first flaps 40 and 42 each preferably include a tab portion 48 and 50, respectively. These tab portions 48 and 50 flatly abut against one side of the first flap 44 so that the tab portions 48 and 50 are adjacent each other. These tab portions 48 and 50 serve to properly position the first flaps 40, 42 and 44 when the collapsible container is moved to its open position. The first flaps 40 and 42 also include second tab portions 49 which flatly abut against each other after final assembly to form a pull tab to facilitate opening of the container 10.

With reference now particularly to FIG. 1, second flaps 60, 62 and 64 are hingedly secured to the end edges 21 of the panels 12, 14 and 16, respectively. These second flaps 60–64 are also movable between an open position (FIGS. 1 and 3) and a collapsed position (FIG. 2). In their collapsed position, the second flaps 60–64, like the first flaps 40–44, are generally coplanar with the panels 14 and 16. However, in their open position (FIG. 1) the second flaps 60–64 only partially close the second end of the triangular structure 30 thus creating an opening 68 to the interior 32 of the structure 30. The second flaps 60–64, in conjunction with the first flaps 40–44, however, define a material retaining area and serve to contain material, such as cat litter 70, within the interior 32 of the structure 30 and yet provide access to the interior 32 of the structure 30 for the cat.

Figure 4:
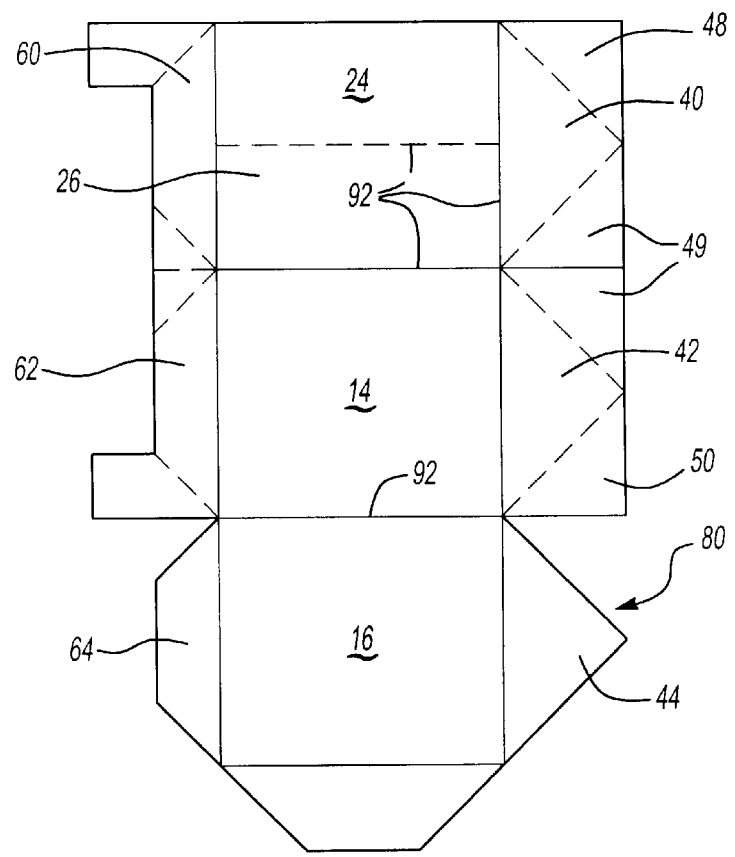
FIG. 4 is a plan view illustrating a blank used in the manufacture of the preferred embodiment of the present invention.
Figure 5:
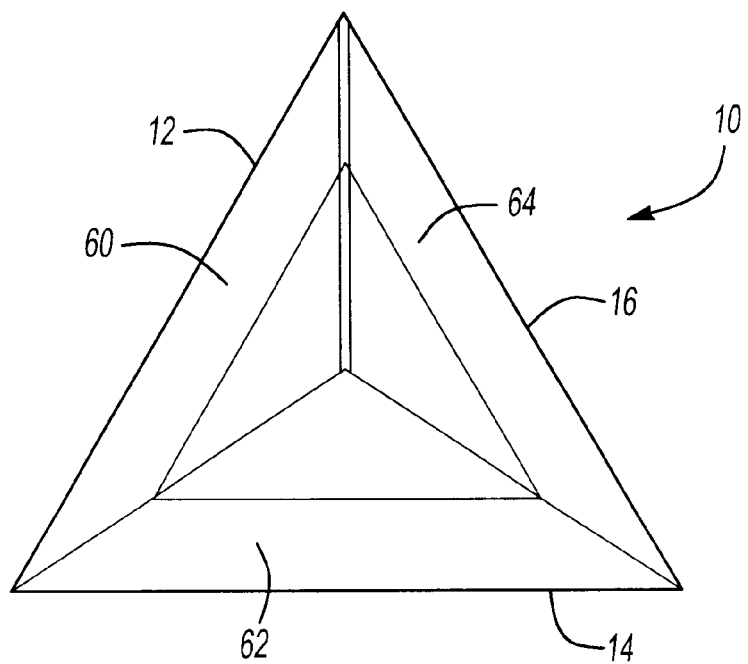
FIG. 5 is an end view similar to FIG. 3, but illustrating the opposite end thereof.

With reference now to FIG. 4, preferably the entire collapsible container is formed from a one-piece cardboard blank 80. Fold lines 92 in the blank 80 form the hinged connections between the panels 12–14 as well as between the panels and the first and second flaps.

The collapsible container can be used in any desired fashion, such as leaf and grass collection. However, the collapsible container of the present invention is particularly advantageous for use as a cat litter box. When used as a cat litter box, all of the cat litter 70 is contained within the interior of the box. Furthermore, when disposal of the cat litter is required, the box can be easily collapsed to its collapsed position (FIG. 2) for disposal of the used cat litter without any handling of the used cat litter. Since the cat litter 70 is contained within the interior of the container, both in its open and collapsed position, the previously known spillage of the cat litter is avoided.

The container of the present invention is further advantageous in that the modern triangular shape of the container makes an ideal store display. Furthermore, the outwardly facing sides of the panels 12–14 can contain indicia of any desired sort. Thus, it can be seen that the container of the present invention maximizes the use of the cardboard blank 80 thus minimizing wastage.

From the foregoing, it can be seen that the present invention provides a collapsible container which is particularly suitable for use as a cat litter box. Having described our invention, however, many modifications thereto will become apparent to those skilled in the art to which it pertains without deviation from the spirit of the invention as defined by the scope of the appended claims.

We claim:

1. A collapsible container comprising:

three generally rectangular panels, each panel having opposed parallel side edges and opposed parallel end edges, said side edges of each panel being hingedly secured to one side edge of each of the other panels, one of said panels having a fold line extending midway between and parallel to said side edges of said one of said panels thus dividing said one of said panels into two subpanels, wherein said panels are movable between an open position in which said panels form a triangular shaped structure, and a collapsed position in which said panels lie in closely adjacent and generally parallel planes to each other;

three first flaps of a one-piece construction, one first flap being hingedly secured to one end edge of each panel and movable between an open position and a collapsed position as said panels are movable between their said open and said collapsed position, respectively, wherein when in said open position, said first flaps substantially close one end of said triangular structure; and three second flaps, one second flap being hingedly secured to the other end edge of each panel and movable between an open position and a collapsed position as said panels are movable between their said open and said collapsed position, respectively, wherein when in said open position, said second flaps partially close said other end of said triangular structure;

wherein said first flaps together with said panels and said second flaps form a material retaining area.

2. The invention as defined in claim 1 wherein said panels are made of cardboard.

3. The invention as defined in claim 1 wherein said three panels are of a one-piece construction.

4. The invention as defined in claim 1 wherein said three panels are constructed from a single one-piece blank.

5. The invention as defined in claim 1 wherein said flaps and said panels are made of cardboard.

6. The invention as defined in claim 1 wherein each first flap comprises a triangular section.

7. The invention as defined in claim 6 wherein a first and a second of said three first flaps comprise a tab portion hingedly secured to said triangular section, said tab portions flatly abutting against one side of a third said first flap.

8. The invention as defined in claim 7, wherein said tab portions are generally coplanar and adjacent each other.

9. The invention as defined in claim 1 and comprising cat litter contained in said material retaining area.

* * * * *